(12) United States Patent
Friedland

(10) Patent No.: US 8,794,191 B2
(45) Date of Patent: Aug. 5, 2014

(54) DISPOSABLE, PROTECTIVE CANINE SOCK/BOOT REQUIRING NO FASTENERS

(71) Applicant: Pawz Dog Boots LLC, Brooklyn, NY (US)

(72) Inventor: Gary Friedland, Brooklyn, NY (US)

(73) Assignee: Pawz Dog Boots LLC, Brooklyn, NY (US)

( * ) Notice: Subject to any disclaimer, the term of this patent is extended or adjusted under 35 U.S.C. 154(b) by 0 days.

(21) Appl. No.: 13/718,401

(22) Filed: Dec. 18, 2012

(65) Prior Publication Data

US 2013/0104427 A1    May 2, 2013

Related U.S. Application Data

(63) Continuation of application No. 13/090,594, filed on Apr. 20, 2011, now Pat. No. 8,360,012, which is a continuation of application No. 12/085,018, filed as application No. PCT/US2006/044099 on Nov. 13, 2006, now abandoned.

(60) Provisional application No. 60/736,651, filed on Nov. 14, 2005.

(51) Int. Cl.
*A01K 13/00* (2006.01)

(52) U.S. Cl.
USPC ......................................................... 119/850

(58) Field of Classification Search
USPC ............. 119/850; 36/111; 446/220; D30/144, D30/146
See application file for complete search history.

(56) References Cited

U.S. PATENT DOCUMENTS

| D26,691 S | 2/1897 | McDonald |
| 1,567,132 A | 12/1925 | Gill |
| 1,941,859 A * | 1/1934 | Hall .............................. 137/150 |
| 2,123,603 A | 7/1938 | Henderson |
| 2,446,371 A | 8/1948 | McNeil Jones |
| D167,092 S | 6/1952 | Monroe |
| 2,604,092 A | 7/1952 | Brown et al. |
| 2,636,492 A | 4/1953 | Wright |
| 2,651,853 A | 9/1953 | Lewis |
| 2,816,542 A | 12/1957 | Freeman |
| 2,904,041 A | 9/1959 | Brown |

(Continued)

FOREIGN PATENT DOCUMENTS

| FR | 2 759 248 | 8/1998 | |
| JP | 11-032615 | 2/1999 | ............. A01K 29/00 |
| WO | WO 02/13640 | 2/2002 | ................ A43B 3/16 |

OTHER PUBLICATIONS

Extended European Search report issued in corresponding application EP 06827789 dated Jun. 22, 2011.

(Continued)

*Primary Examiner* — Yvonne Abbott

(74) *Attorney, Agent, or Firm* — Davidson, Davidson & Kappel, LLC

(57) ABSTRACT

A disposable dog boot comprising a single, seamless piece of flexible latex or polymer material having a bulbously shaped, bottom closed end and a top open end of a smaller cross-section, wherein when a paw of the dog is slipped into the boot, the bottom end covers and loosely conforms to the paw to protect the paw, and the top end flexibly and removably secures, through the material's elasticity, the boot to a leg of the dog.

6 Claims, 2 Drawing Sheets

(56) References Cited

U.S. PATENT DOCUMENTS

| | | |
|---|---|---|
| 4,457,261 A | 7/1984 | Marshall |
| 4,543,911 A | 10/1985 | Marshall |
| 4,798,554 A * | 1/1989 | Nelson et al. ............ 446/222 |
| D335,901 S | 5/1993 | Gill, III |
| 5,495,828 A | 3/1996 | Solomon et al. |
| D379,251 S | 5/1997 | Mezey |
| 5,676,095 A | 10/1997 | Ralls |
| 5,682,617 A | 11/1997 | Tumas |
| 5,720,330 A * | 2/1998 | Schmalz, Jr. ............ 141/26 |
| 5,755,648 A * | 5/1998 | Kildani ............ 482/121 |
| D417,530 S | 12/1999 | Danek |
| 6,186,097 B1 | 2/2001 | Brockmann et al. |
| 6,931,767 B2 | 8/2005 | Royle |
| 7,584,721 B2 | 9/2009 | Vogelman |
| 2003/0154625 A1 | 8/2003 | Royle |
| 2003/0164145 A1 | 9/2003 | St. John |
| 2005/0092260 A1 | 5/2005 | Paxton et al. |
| 2006/0042563 A1 | 3/2006 | Galloway et al. |
| 2007/0028857 A1 | 2/2007 | Cooney |
| 2007/0074677 A1 | 4/2007 | Behme |
| 2007/0175409 A1 | 8/2007 | Vogelman |
| 2008/0127907 A1 | 6/2008 | Purtell et al. |
| 2008/0229618 A1 | 9/2008 | McKay-Leffler |
| 2009/0094864 A1 | 4/2009 | Ketzenberg et al. |
| 2009/0266310 A1 | 10/2009 | Behme |
| 2012/0066932 A1 | 3/2012 | Friedland |

OTHER PUBLICATIONS

Office Action issued in corresponding application JP 2008-540267 dated Mar. 22, 2011.

Office Action issued in corresponding application JP 2008-540267 dated Mar. 6, 2012.

Office Action issued in corresponding application CA 2,629,151 dated Sep. 26, 2011.

Office Action issued in corresponding application CA 2,629,151 dated Sep. 20, 2012.

* cited by examiner

DISPOSABLE, PROTECTIVE CANINE SOCK/BOOT REQUIRING NO FASTENERS

CROSS REFERENCE TO RELATED APPLICATIONS

This application is a continuation of U.S. application Ser. No. 13/090,594, filed on Apr. 20, 2011, which was published as U.S. Patent Publication Serial No. US 2012-0066932 A1 on Mar. 22, 2012; which is a continuation of U.S. patent application Ser. No. 12/085,018, filed May 14, 2008 which is a national phase application under 35 U.S.C. §371 of International Application No. PCT/US2006/044099, filed Nov. 13, 2006, which claims priority from U.S. Provisional Patent Application Ser. No. 60/736,651 entitled "Disposable Protective Canine Sock/Boot Made of Light Weight, Waterproof, Flexible Latex or Polymer Material and Requires No Fasteners", filed on Nov. 14, 2005, the disclosures of which are all hereby incorporated by reference herein.

FIELD OF THE INVENTION

The present invention relates to paw protection for canines, and more particularly to a slip-on, waterproof, disposable, canine sock/boot for protecting the animal from insects, chemicals, liquids, soil, heat/cold, and medical problems.

BACKGROUND OF THE INVENTION

In recent years dog owners have become better educated regarding dangers to a dog's paw, such as snow-melting chemicals on the sidewalk in the winter, lawn chemicals, red ants and pad rashes. In an effort to keep their pets safe, more dog owners have been putting their pet in a "dog boot". A typical boot consists of fabric stitched into the shape of a paw with a padded sole and a Velcro, zipper or strap closure.

The problems with such conventional products are that they are expensive, dogs don't like to wear them and they can fall off and get lost. The reason such boots fall off is that they don't bend and move with the dog's paw and leg, so that all of the straps and other closures need to remain loose enough to allow the dog's paw to bend. However, such looseness makes it impossible to tighten the closures enough to keep the boots on. When a dog owner loses one such boot, he must buy another set of four boots, which can be expensive.

Additionally, such boots are unfortunately not waterproof, so that they cannot protect the paws against any liquid. Furthermore, they typically approach the problem of creating dog boots by designing human-type shoes to fit canines. Thus, dogs dislike them because they cannot feel the ground through the padded sole, which makes them insecure and less sure-footed.

There are a number of dog boots that are currently known and old in the art. As discussed above, they usually revise human-type shoes to fit canines. Thus, they typically have numerous components such as padded soles and straps, zippers, Velcro or other mechanical closures. Examples of such prior art include U.S. Pat. No. 5,408,812, which discloses a dog boot having numerous components including securing straps and buckles, and is moisture-resistant but not waterproof. U.S. Pat. No. 5,495,828 also discloses an animal boot that has many components, such as liners and a fastening strap.

The animal boot shown in U.S. Pat. No. 6,470,832 B1 similarly has a multi-element design, including fasteners for the flexible sole and a strap, which is non-waterproof. U.S. Pat. No. 6,526,920 B1 discloses another non-waterproof, multi-element design for hunting dogs, which includes a thick rubber sole, zippers and straps. Similar observations apply to the multi-component dog boot disclosed in U.S. Pat. No. 5,148,657.

Other multi-element configurations include the dog booties with polyacrylamide granules between layers of fabric to keep the paws cool in U.S. Pat. No. 5,452,685; the canine footwear with a rubberized sole of U.S. Pat. App. Pub. No. US 2005/0241188 A1 and US 2005/0188925 A1; a dog boot with many surfaces and elements shown in U.S. Pat. App. Pub. No. US 2005/0092260 A1; a dog boot shown in U.S. Pat. No. 6,546,704 B1 which uses layers of various materials and surface textures and a stabilizer strap; and footwear for hooved animals as shown in U.S. Pat. No. 5,528,885.

U.S. Pat. Nos. 4,744,333 and 4,633,817 both disclose protective footwear for animals that include a complex suspender system that goes over the animal's back, as well as a yarn sock and a deerskin boot. Similarly, the paw coverings of U.S. Pat. No. 5,676,095 utilizes a harness, and is a device for covering cats' paws to prevent them from damaging furniture with their claws.

U.S. Pat. App. Pub. No. 2003/0164145 A1 discloses a paw covering comprising a tube-shaped, condom-like sleeve formed of latex. The device rolls up the dog's paw like a condom and fits tightly around the paw. It has the objective of protecting the dog owner's house from getting soiled by dirty dog paws, when the dogs come in from the outside. However, such a device may also pose problems in that the shapes of the paws, the dogs' claws and dew claws may prevent the tube-shaped device from rolling onto the paw. Additionally, even if the device did roll on, it may then easily roll off during use. Also, the device does not have the purpose of protecting the dog's paws.

U.S. Pat. App. Pub. No. 2004/0133144 A1 shows an animal cast and bandage protector for covering a cast or bandage to keep it dry and clean. However, it essentially functions as a cast/bandage covering rather than as a dog boot. U.S. Pat. App. Pub. No. 2006/0042563 A1 discloses an animal paw cover for keeping the paws clean. It is water-resistant and is constructed using heat sealed edges. It is contoured to the shape of a paw, rather than being comfortably loose, and it does not have the purpose of protecting the animals' paws. U.S. Pat. App. Pub. No. 2006/0037561 A1 discloses an animal boot utilizing a number of elements including a reinforced toe and a sock or sleeve, that must extend up the dog's leg past the elbow.

Consequently, a device for providing simple, effective, and waterproof protection for the paws of canines, which also slips on and off easily with no closures and remains on, and that dogs do not resist wearing, is highly desired.

SUMMARY OF THE INVENTION

A disposable dog boot having a single, seamless piece of flexible latex or polymer material having a bulbously shaped, bottom closed end and a top open end of a smaller cross-section, wherein when a paw of the dog is slipped into the boot, the bottom end covers and loosely conforms to the paw to protect the paw, and the top end flexibly and removably secures, through the material's elasticity, the boot to a leg of the dog.

It is embodied in another mode of the invention a method of protecting the paw of a dog having producing a disposable dog boot as a single, seamless piece of flexible latex or polymer material, having a bulbously shaped, bottom closed end and a top open end of a smaller cross-section; and slipping the paw into the boot, whereby the bottom end covers and loosely conforms to the paw to protect the paw, and the top end flexibly and removably secures, through the material's elasticity, the boot to a leg of the dog.

BRIEF DESCRIPTION OF THE DRAWINGS

For a fuller understanding of the invention, reference is made to the following description taken in connection with the accompanying drawings, in which.

DETAILED DESCRIPTION OF THE PREFERRED EMBODIMENTS

As shown in the figures, the present invention relates to protective wear for canine paws that protects the paws from dangers such as the elements, chemicals, liquids, insects, soil, heat/cold, ice, and pad rashes, post-surgical infections and other medical problems. In particular, the sock/boot 10 for canines of the present invention is bulb-shaped and has a closed, bulbous bottom end 20 and an open, top end 30.

The top end 30 has a short, tube-like opening, having a smaller cross-section than the rest of the sock/boot 10. The material of the sock/boot is rolled over once at the top end 30 to form a rim 40.

The sock/boot device is made of a latex or polymer material that is very flexible, lightweight and waterproof. As an example, the material may be one that is commercially available (e.g., in the manufacture of balloons). The thickness may be the thickness of a standard latex balloon, or thicker. A thickness greater than the thickness of a standard balloon may be produced by dipping the formers (the balloon molds) twice into the latex or polymer material (called "double dipping"), or by some other means as is well known in the art.

The sock/boot protective wear is one-piece and entirely seamless. It can be made in a variety of sizes or widths and lengths. The appropriate size can then be selected according to the width of the canine's paws. The sock/boot can also be made with various colors or patterns.

Figure 1:
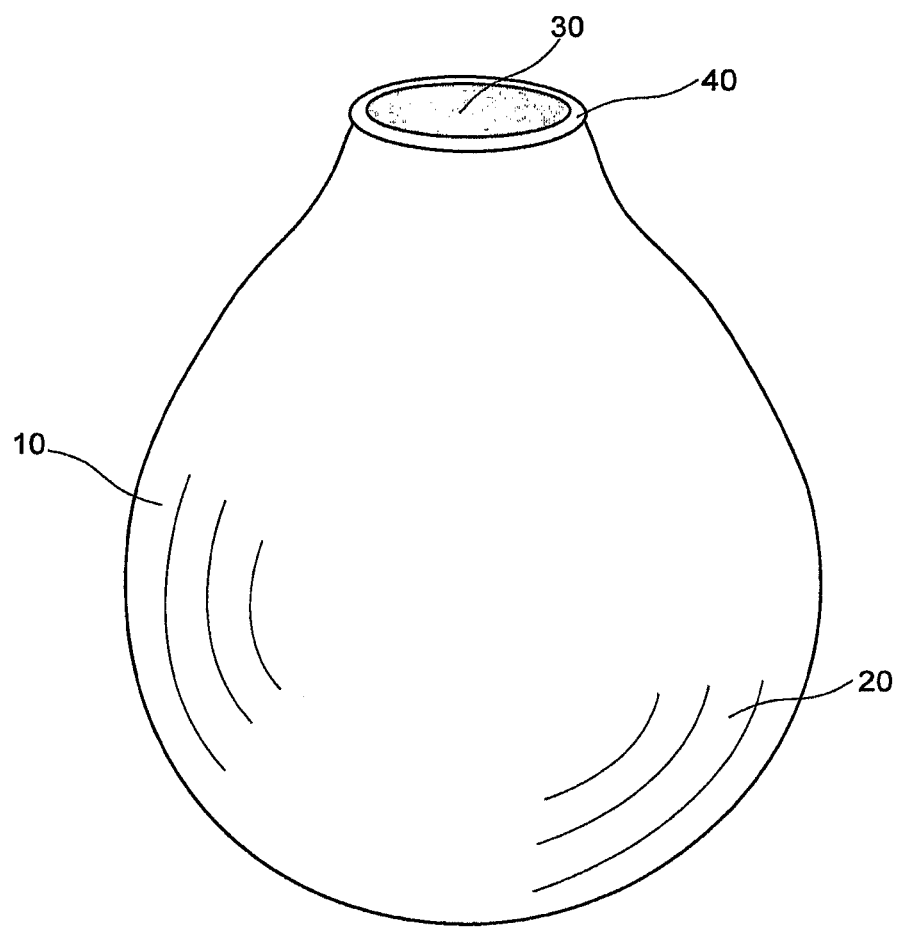
FIG. 1 is a perspective view of the canine sock/boot of the present invention.
Figure 2:
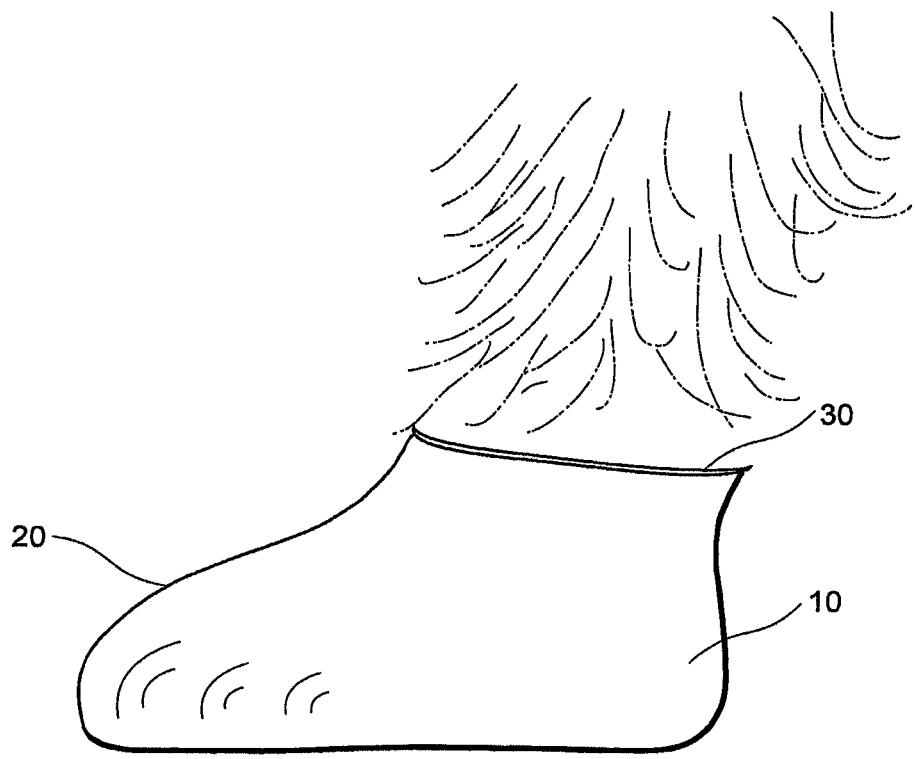
FIG. 2 is a side elevational view showing the canine sock/boot of the present invention as worn on a dog's paw.

In use, the narrower top end 30 is widened, and the dog's paw is inserted into the narrow opening toward the wider bulbous area 20. Then, the narrower top end 30 is released to snugly secure the sock/boot to the dog's leg, as shown in FIG. 2. Thus, the sock/boot is slipped over the paw in a fashion similar to that of a person putting on a sock. As illustrated in FIG. 2, the bottom end 20 comfortably conforms to the shape of the paw, while remaining loose.

When the canine walks or runs, the sock/boot remains securely on the canine's leg. It does not come off during such usage. However, due to the flexibility and elasticity of the latex or polymer material, it does not cut off the canine's circulation, and it allows the canine to make such movements naturally.

Then, one can easily take off the sock/boot, by simply pulling it off. Thus, a protective canine sock/boot is provided that is simple and requires no fasteners or closures. It can be easily slipped over the animal's paw and then taken off. Yet, it remains snugly secured to the dog's leg and does not fall off, during use.

As described above, all of the canine boots currently on the market use various devices to fasten the boots to the legs or paws. Such devices include straps, zippers, Velcro, buttons, elastic bands or other additional closure devices. Consequently, the prior art boots are difficult to put on and often fall off during use. Such a problem leaves the canine unprotected and the dog owner with only three remaining dog boots. The dog owner then needs to purchase another set of four dog boots, just to replace the missing single boot. The sock/boot of the present invention avoids such very common and expensive problems.

Furthermore, the sock/boot of the present invention is disposable or semi-disposable. Depending on durability against wear and tear, it may also be reused many times. Thus, the dog owner can cheaply and easily provide continuous paw protection, while replacing a lost or worn out sock/boot cheaply and easily.

As described above, another conventional problem is that canines very frequently resist wearing protective paw coverings. The primary reason that canines resist wearing such boots is that they are typically made like a human's shoe, with padding in the sole and closure devices. With such a conventionally constructed boot, the canine cannot feel the ground through the boot. This feels most discomforting to the canine.

The sock/boot of the present invention eliminates this problem by being very flexible and thereby bending where the canine's paw bends. While still providing protection, the unpadded sole allows the canine to feel the ground, thereby providing a sense of security and sure-footedness. Due to such novel features, dogs that previously have not been able to wear other conventional dog boots, have been accepting of the sock/boot of the present invention.

In addition to its use as everyday protective wear, it can also be used to protect or cover wounded or injured paws, or more generally, to keep the paws clean from outdoor dirt. Thus, it can accomplish both animal paw protection and protection of the owner's furniture and house against outdoor dirt, etc.

The foregoing description of the embodiments of this invention has been presented for purposes of illustration and description. It is not intended to be exhaustive or to limit the embodiments of the invention to the form disclosed, and, obviously, many modifications and variations are possible. All such modifications and variations that may be apparent to a person skilled in the art are intended to be included within the scope of this invention as defined by the accompanying claims.

What is claimed is:

1. A disposable dog boot consisting of:
   a single, seamless piece of flexible latex or polymer material having an interior portion and an exterior portion:
   1) a bulbously shaped, bottom closed end of a size to loosely fit the paw of a dog;
   2) a top open end of a smaller cross-section having a short, tube-like opening of a size to flexibly secure the dog boot in place against the leg of the dog; and
   3) a ring-shaped lip,
   wherein said short, tube-like opening is wider at an end adjacent to the bulbously shaped bottom closed end and narrows to a top end adjacent to the ring-shaped lip and wherein when a paw of the dog is slipped into the interior portion of the boot, the bottom closed end covers and loosely conforms to the paw to protect the paw, and the top open end flexibly and removably secures, through the material's elasticity, the boot to a leg of the dog.

2. The dog boot of claim 1, wherein the latex or polymer material permits the easy putting on and removal of the boot through pulling on the boot.

3. The dog boot of claim 2, wherein the latex material has a thickness equal to or greater than a standard thickness of a latex balloon.

4. The dog boot of claim 1, wherein the latex or polymer material is waterproof.

5. The dog boot of claim 1, wherein the latex or polymer material is durable such that the dog boot can withstand normal wear and tear, and is flexible so that a dog wearing the boot can feel the ground through the boot.

6. The dog boot of claim 1, wherein the latex or polymer material is lightweight.

\* \* \* \* \*